United States Patent [19]

Malecha

[11] Patent Number: 5,183,139
[45] Date of Patent: Feb. 2, 1993

[54] OVERRUNNING CLUTCH HAVING A CAGE DESIGN FOR DIRECTING LUBE FLOW

[75] Inventor: Gregory J. Malecha, Naperville, Ill.

[73] Assignee: Borg-Warner Automotive Transmission & Engine Components Corporations, Sterling Heights

[21] Appl. No.: 819,153

[22] Filed: Jan. 9, 1992

[51] Int. Cl.[5] ............................................. F16D 41/06
[52] U.S. Cl. ........................ 192/45; 192/41 R; 192/41 A; 192/45.1; 192/113 B
[58] Field of Search ............... 192/41 R, 41 A, 45, 192/45.1, 113 B; 384/470, 475, 572

[56] References Cited

U.S. PATENT DOCUMENTS

| | | | |
|---|---|---|---|
| 2,292,988 | 8/1942 | Bloomfield et al. | 192/45 |
| 3,175,661 | 3/1965 | Maurer et al. | 192/45.1 |
| 3,597,031 | 8/1971 | Bill | 384/470 |
| 4,131,188 | 12/1978 | Charchian | 192/113 B |
| 4,191,279 | 3/1980 | Brown | 188/82.84 |
| 4,192,560 | 3/1980 | Hartnett | 384/572 |
| 4,291,795 | 9/1981 | Charchian et al. | 192/113 B |
| 4,560,056 | 12/1985 | Stockton | 192/113 B |
| 4,714,803 | 12/1987 | Lederman | 192/41 R |
| 4,756,395 | 7/1988 | Zlotek | 192/41 A |
| 4,787,757 | 11/1988 | Finger | 384/470 |
| 4,874,069 | 10/1989 | Lederman | 192/45 |
| 4,874,260 | 10/1989 | Podhajecki | 384/470 |
| 4,875,564 | 10/1989 | Leitz et al. | 192/45.1 |
| 4,913,271 | 4/1990 | Kinoshita et al. | 192/41 R |

FOREIGN PATENT DOCUMENTS

| | | | |
|---|---|---|---|
| 2601735 | 1/1988 | France | 192/113 B |
| 1-108423 | 4/1989 | Japan | 192/45.1 |

Primary Examiner—Richard M. Lorence
Attorney, Agent, or Firm—Brooks & Kushman

[57] ABSTRACT

An overrunning clutch comprises opposed inner (12) and outer (14) races defining an annular space (16) therebetween, rollers (40) or sprags (18), and a cage (22), the cage (22) being disposed in the annular space (16) and cooperating with the sprags (18). The cage (22) includes a plurality of interconnecting elements (24,41), each of which has an inner side (28) facing the inner race (12), the inner side of each interconnecting element (24,41) being contoured to redirect at least a portion of the lubrication supplied through oil holes (20) back toward the inner race (12).

9 Claims, 1 Drawing Sheet

OVERRUNNING CLUTCH HAVING A CAGE DESIGN FOR DIRECTING LUBE FLOW

TECHNICAL FIELD

This invention relates to an overrunning clutch, and more particularly to an overrunning clutch with concentric inner and outer clutch races and clutch elements in the form of sprags or rollers and having a cage design for redirecting lube flow supplied from the inner race back toward the inner race.

BACKGROUND ART

One-way or overrunning clutches transmit torque in one direction only and are generally used to disengage a drive connection automatically when torque is applied in the reverse direction. Overrunning clutch elements generally are contained within the annular space between two opposed, concentric races. The inner race is keyed or otherwise fixed to an input shaft, and the outer race is fixed to a hub, or sleeve, from which the drive is ultimately taken. Alternatively, the outer race may form the torque input member and the inner race may form the torque output member.

In a sprag-type overrunning clutch, a series of rocking tumblers or sprags is held together within a cage. The cage typically includes two rings and a crimped ribbon spring in the annular space between the rings. All three components of the cage are pierced to accommodate the sprags. The ribbon spring biases the sprags upright between the inner and outer races of the drive coupling. Because the radial clearance between the races is not enough for the sprags to rock all the way to their top dead center positions, the sprags jam between the races. As long as the drive is in the direction tending to keep the sprags thus jammed, torque is transmitted from the input shaft, through the inner race, and finally to the outer race. Whenever the drive is reversed, the sprags tend to lay down against the influence of the ribbon spring, and no torque is transmitted.

A second type of overrunning clutch uses rollers instead of sprags. These rollers are housed in inclined recesses formed in the annular space between the inner and outer races. When the shaft is rotated in one direction, the rollers run up the inclines and jam between the inner and outer races. If the shaft is thereafter rotated in the other direction, the rollers run down the inclines and are freed in the space between the two races, which is wider than the diameter of the rollers. To obviate backlash in the system, the rollers may be spring-loaded up the inclines.

Because the two races rotate at high relative speeds, heat and friction can quickly wear down the components of the overrunning clutch, particularly the contact surface between the inner race and the sprags or rollers. Adequate lubrication of the components of an overrunning clutch is, therefore, very important.

Various designs have been proposed for supplying lubrication to the overrunning clutch components. These include U.S. Pat. No. 4,875,564 to Leitz et al., which discloses a sprag clutch having bores provided through lateral discs flanking the cage and the sprags. This allows oil to flow through the bores and into the space between the inner and outer races.

U.S. Pat. No. 4,874,069 to Lederman discloses a roller clutch provided with an internal oil passage in the cage that is open to one side. Oil which is normally supplied from oil passages in the inner race can then be supplied to the internal oil passage in the cage. Therefore, pressurized oil can be distributed all the way through to the center of the cage.

U.S. Pat. No. 4,756,395 to Zlotek discloses a sprag-type overrunning clutch having an actuating ring in the form of a sleeve bushing. Recesses formed in the inner radial surface of the bushing trap lubricant and create a fluid drag as the surface of the inner race rotates relative to the bushing at high relative RPM. This drag tends to displace the bushing relative to the sprag retainer so as to lift the sprags from the inner race surface in the overrunning mode, thereby reducing sprag wear.

A problem with these designs is that lubrication is not readily retained close to the inner race. The centrifugal force of the rapidly spinning races tends to fling the lubrication radially outwardly, away from the inner race. Because the inner race is the primary wear surface, an overabundance of oil must constantly be supplied to adequately lubricate the inner race contact surface.

SUMMARY OF THE INVENTION

It is an object of the present invention to provide an overrunning clutch having a cage which is specially contoured for redirecting at least a portion of the lubrication supplied from an inner race back toward the inner race.

Another object of the present invention is to provide an overrunning clutch of the type described above in which the lubrication flow back toward the inner race is enhanced by forming arcuate slots in the inner side of the cage to assist in redirecting the lube.

It is another object of the present invention to provide an overrunning clutch of the type described above in which the slots in the inner side of the cage are in the form of venturis.

In carrying out these and other objects of the present invention, an overrunning clutch is provided comprising an inner race, an outer race, unidirectional drive means positioned between the races, means for supplying lubrication to the clutch components, and a cage. The inner race and the outer race are generally coaxial, and define an annular space therebetween. The unidirectional drive means selectively fix the outer race against rotation in one direction relative to the inner race.

The means for supplying lubrication to the clutch components is in the form of oil holes formed in the inner race. The cage, which is disposed in the annular space between the inner and outer races, cooperates with the unidirectional drive means. The cage includes a plurality of interconnecting elements, each having an inner side facing the inner race and an outer side facing the outer race. The inner sides of the interconnecting elements are specially contoured for redirecting at least a portion of the lubrication supplied from the inner race back toward the inner race.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

With reference to the drawings, the preferred embodiments of the present invention will be described.

Figure 1:
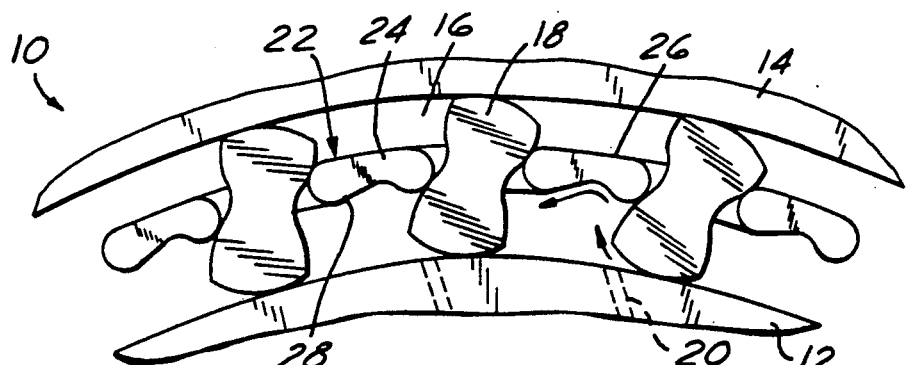
FIG. 1 is a cross-sectional view of a sprag-type overrunning clutch according to the present invention.

FIG. 1 shows an overrunning clutch 10 including a hardened steel inner race 12 and a hardened steel outer race 14. The inner race 12 is keyed or otherwise fixed to a drive shaft (not shown) having a central axis of rotation. The outer race 14, which is fixed to a hub or sleeve (not shown) from which the drive is ultimately taken, is disposed around and generally coaxial with the inner race 12. The inner and outer races define a radially extending annular space 16 between their opposed faces.

A plurality of sprags 18 is disposed in the annular space 16. They function as unidirectional drive means for selectively fixing the outer race 14 against rotation in one direction relative to the inner race 12. Thus, when the inner race 12 is rotated in the clockwise direction as shown in FIG. 1, the sprags 18 jam short of their fully upright position, and torque is transmitted to the outer race 14. When the inner race is rotated in the opposite direction, however, the sprags 18 lay down so that no torque is transmitted.

Oil holes 20 are in fluid communication with a source of lubricant, and supply lubrication from the inner race 12 to the annular space 16 between the inner and outer races. Preferably, the lubrication is oil that is provided under pressure by a pump (not shown). A cage 22, preferably made of molded aluminum or a composite material, is also disposed in the annular space 16. It encompasses and retains the sprags 18. The cage 22 includes a plurality of interconnecting elements 24, each of which generally has an outer side 26 and an inner side 28. The outer side 26 faces the outer race 14, while the inner side 28 faces the inner race 12. Spring means (not shown) may also be provided in the cage 22 to normally bias the sprags 18 toward their top dead center position.

The inner side 28 of the interconnecting elements 24 is specially contoured to redirect at least a portion of the lubrication supplied through the oil holes 20 in the inner race 12 back toward the inner race 12. To accomplish this, the surface of the inner side 28 of the interconnecting elements 24 is concave. Preferably, the deepest indentation of the concave surface is situated closer to the point at which the oil contacts the inner side 28, with the concave surface tapering more gradually along the path of the oil flow as it is expelled from the inner side 28. When oil is supplied through the lube holes 20, it thus follows the path shown generally by the arrows. It should be understood, however, that the optimum inner cage profile to produce the desired hydrodynamic action is a function of design parameters such as the quantity, spacing and angle of the oil holes 20 in a particular application.

Figure 2:
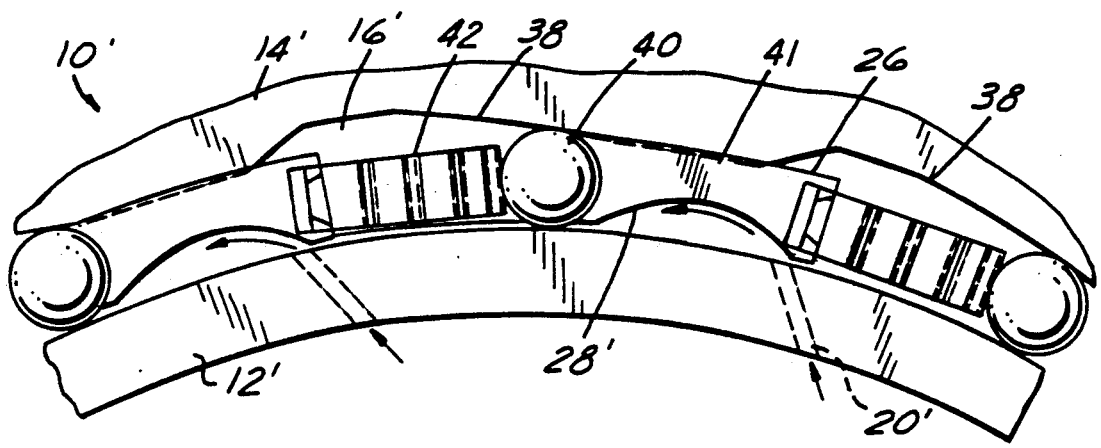
FIG. 2 is a cross-sectional view of a roller-type overrunning clutch according to the present invention.

FIG. 2 shows an alternative embodiment of the present invention in cooperation with a rollertype overrunning clutch 10'. In this embodiment, the annular space 16' between the races includes a series of spaced apart inclines 38 formed in the outer race 14'. As one skilled in the art can appreciate, these inclines could alternatively be formed in the inner race 12, as shown in U.S. Pat. No. 4,714,803 to Lederman.

A series of rollers 40 is provided in the annular space 16'. The rollers 40 are biased toward the narrow end of each incline 38 and against interconnecting elements 41 by lightly loaded springs 42. When the inner race 12' rotates in the clockwise direction as shown in FIG. 2, the rollers are jammed between the races, and torque is transmitted. When the inner race 12' rotates in the opposite direction, the rollers 40 are freed, and no torque is transmitted to the outer race 14'.

The oil holes 20' again supply lubrication from the inner race 12'. The oil flows out of the coil holes 20' and along the contoured surface of inner side 28' of the interconnecting elements 41. In this embodiment, the concave inner surface 28' is more uniformly parabolic than the surface of inner side 28 of the embodiment shown in FIG. 1. The function is the same, however, as the oil is directed back along the inner side 28' and toward the inner race 12'. The arrows again indicates the general flow of the oil against the rotation of the inner race 12'.

Figure 3:
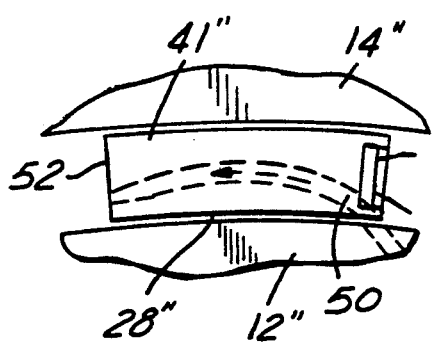
FIG. 3 is a cross-sectional view of an alternative embodiment of an interconnecting element of the embodiment of the present invention shown in FIG. 2.

FIG. 3 illustrates an alternative design for the interconnecting elements as shown at 41". The inner side 28" of the interconnecting element 41" is slightly curved along its length so as to conform at all points to the curvature of the inner race 12", but alternatively the inner side 28" might be generally planar with sufficient clearance from the inner race 12" to avoid interference with race 12" during operation. An arcuate lube slot 50 is formed through the interconnecting element 41", extending from an entry point on the inner side 28" to an exit point on the side wall 52 of the interconnecting element 41". The lube slot 50 is preferably formed in the shape of a venturi or nozzle, such that the oil flows through the wider portion of lube slot 50 and accelerates through the narrower throat of the slot 50 before it is discharged through the side wall 52, and back against the inner race 12". The particular shape of the slot 50 is dictated to provide optimum lubrication flow through the range of speeds to which the inner race 12" and outer race 14" operate.

It should be understood that while the forms of the invention herein shown and described constitute preferred embodiments of the invention, they are not intended to illustrate all possible forms thereof. It also should be understood that the words used are words of description rather than limitation, and various changes may be made without departing from the spirit or scope of the invention claimed.

I claim:

1. An overrunning clutch (10) comprising:
   an inner race (12) having a central axis of rotation;
   an outer race (14) disposed around the inner race (12), the inner and outer races defining an annular space (16) therebetween;
   unidirectional drive means for fixing the outer race against rotation relative to the inner race;
   means for supplying lubrication from the inner race (12) to the annular space (16) between the inner and outer races;
   a cage (22) disposed in the annular space (16) between the inner and outer races and retaining the unidirectional drive means, the cage (22) including a plurality of interconnecting elements (24,41) each having an inner side (28) facing the inner race (12) and an outer side (26) facing the outer race (14); and venturi means for accelerating lubrication flow through at least one of the interconnecting elements and back toward the inner race.

2. The overrunning clutch (10) of claim 1 wherein the inner side (28) of the interconnecting elements (24,41) is concave.

3. The overrunning clutch (10) of claim 1 wherein the inner side (28) of the interconnecting elements (24,41) is curved to conform to the curvature of the inner race (12).

4. The overrunning clutch (10) of claim 1 wherein the means for supplying lubrication from the inner race (12) comprises a plurality of oil holes (20) formed in the inner race (12).

5. The overrunning clutch (10) of claim 1 wherein the unidirectional drive means comprises a plurality of sprags (18) disposed in the annular space (16) between the inner and outer races.

6. The overrunning clutch (10) of claim 1 wherein the annular space (16) between the inner and outer races includes a series of spaced apart inclines (38), and the unidirectional drive means comprises a plurality of rollers (40) disposed in the annular space (16).

7. The overrunning clutch (10) of claim 1 wherein the outer race (14) is generally coaxial with the inner race (12).

8. An overrunning clutch (10) comprising:
an inner race (12) having a central axis of rotation;
an outer race (14) disposed around the inner race (12), the inner and outer races defining an annular space (16) therebetween;
unidirectional drive means for fixing the outer race against rotation relative to the inner race;
means for supplying lubrication form the inner race (12) to the annular space (16) between the inner and outer races; and
a cage (22) disposed in the annular space (16) between the inner and outer races and retaining the unidirectional drive means, the cage (22) including a plurality of interconnecting elements (24,41) each having an inner side (28) facing the inner race (12) and an outer side (26) facing the outer race (14), at least one of the interconnecting elements (24,41) also having an arcuate lube slot, the lube slot being adapted to redirect at least a portion of the lubrication supplied from the inner race back toward the inner race (12).

9. An overrunning clutch (10) comprising:
an inner race (12) having a central axis of rotation;
an outer race (14) disposed around the inner race (12), the inner and outer races defining an annular space (16) therebetween;
unidirectional drive mans for fixing the outer race against rotation relative to the inner race, the unidirectional drive means including clutch elements engaging the inner race along a contact surface;
means for supplying lubrication from the inner race (12) to the annular space (16) between the inner and outer races; and
a cage (22) disposed in the annular space (16) between the inner and outer races and retaining the unidirectional drive means, the cage (22) including a plurality of interconnecting elements (24,41) each having an inner side (28) facing the inner race (12) and an outer side (26) facing the outer race (14), at least one of the interconnecting elements (24,41) also having an arcuate lubrication flow surface located between adjacent clutch elements, the lubrication flow surface being adapted to redirect at least a portion of the lubrication supplied from the inner race toward the contact surface.

* * * * *

UNITED STATES PATENT AND TRADEMARK OFFICE
CERTIFICATE OF CORRECTION

PATENT NO. : 5,183,139
DATED : February 2, 1993
INVENTOR(S) : Gregory J. Malecha It is certified that error appears in the above-identified patent and that said Letters Patent is hereby corrected as shown below:

Column 4, line 13, "coil holes" should be --oil holes--.

Column 6, line 17, Claim 9, "mans" should be --means--.

Signed and Sealed this

Eighteenth Day of January, 1994

Attest:

BRUCE LEHMAN

Attesting Officer

Commissioner of Patents and Trademarks